United States Patent

[11] 3,614,024

[72] Inventor Victor Millman
San Diego, Calif.
[21] Appl. No. 25,776
[22] Filed Apr. 6, 1970
[45] Patented Oct. 19, 1971
[73] Assignee Rohr Corporation
Chula Vista, Calif.

[54] COMBINED WATER SURFACE AND AIR CRAFT
7 Claims, 3 Drawing Figs.

[52] U.S. Cl. ................................................ 244/2,
114/43.5, 244/63
[51] Int. Cl. ................................................ B64d 3/00
[50] Field of Search ................................... 244/2, 63,
62, 154, 3, 1, 1 TD; 115/6.1, 70; 114/235, 66.5

[56] References Cited
UNITED STATES PATENTS
1,825,363 9/1931 Robertson .................. 114/66.5
2,914,018 11/1959 Schachner et al. ........... 115/6.1
2,991,959 7/1961 Rizzo ........................... 244/3
3,294,345 12/1966 Cottrell ....................... 244/3

*Primary Examiner*—Milton Buchler
*Assistant Examiner*—Carl A. Rutledge
*Attorney*—George E. Pearson ABSTRACT: A motorless aircraft carrying a pilot, and, if desired, one or more passengers, is mounted on a high-speed water surface craft having servocontrolled propulsion and steering mechanism. Each of one or more power winches in the surface craft controls the reeling out and in of a towing cable and, optionally, electrical conductors. Electrical pilot controlled means in the aircraft are operatively connected to electrically responsive individual servo means controlling the propulsion, steering and winch means in the surface craft, so that a pilot in the aircraft can maneuver the surface craft with the aircraft mounted thereon on the surface of the water, and can take off from the water craft at a determined minimum air speed upon unreeling the tow cable. He then flies the aircraft in the manner of a towed glider, while still maintaining full operational control of both the surface and air craft.

PATENTED OCT 19 1971 3,614,024

*INVENTOR.*
VICTOR MILLMAN
BY
George E. Pearson
ATTORNEY

COMBINED WATER SURFACE AND AIR CRAFT

BACKGROUND OF THE INVENTION

In the past various types of aircraft, such as kites and gliders, have been towed by land vehicles and power boats, but in such cases the towing vehicle or boat has not been under the sole control of the pilot of the aircraft.

SUMMARY OF THE INVENTION

A primary objective of the invention is to provide a combined water surface craft and aircraft which is at all times under the full and exclusive control of an operator or pilot in the aircraft, which can be maneuvered on the surface of the water with the aircraft seated on the surface vessel, and wherein the aircraft can be flown like a towed glider, with the aircraft and its pilot and passengers completely airborne and free from buffeting by any waves which the surface craft portion of the combination may encounter.

BRIEF DESCRIPTION OF THE DRAWINGS

The foregoing objectives and advantages of the invention will be apparent from the following description and the accompanying drawings, wherein.

DETAILED DESCRIPTION

Figure 2:
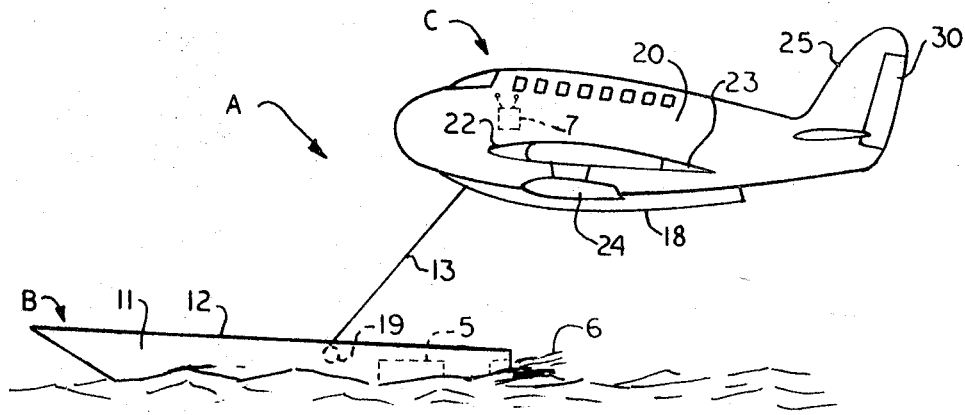
FIG. 2 is a side elevational view of the combination shown in FIG. 1 with the aircraft portion thereof in towed flight.

Referring to the drawings in detail, a surface craft—aircraft combination A embodying the invention comprises a high-speed surface craft B, and an aircraft C in the nature of a towed glider. The particular type of surface craft employed is not limited to any specific design, and it would be feasible to use any of a wide variety of well-known planing hull designs, or even one of the well-known hydrofoil designs.

The surface craft B may be of the twin-hull type illustrated and may be decked completely over if desired, which would prevent the hulls from taking any water over the side, but in such case an entrance hatch, not shown, of any suitable or well-known type should be provided which can be opened from the outside, as well as some means for getting aboard from the water in case of accident or emergency. Such structural features are well within the capability of any ordinarily skilled naval architect or boat builder, and are not per se features of the present invention.

Suitable propulsion means are provided for the surface craft B, such as, for example, an internal combustion engine 5, see FIG. 2, mounted one in each of the hulls 10 and 11, each engine driving suitable propulsion mechanism, such as a propeller or water jet 6. The deck 12 of the surface craft B is provided with means for supporting an aircraft C in centered relation thereon when the aircraft is drawn down onto the deck 12 of the surface craft B by a towing cable 13, see FIG. 1. Means for centering the aircraft C on the deck 12 of the surface craft B comprises suitable guide means, for example two longitudinal V-grooves 14 and 15 in the deck 12, see FIG, 2, with registering V-tracks 17 and 18 on the aircraft C, and the deck 12 sloping slightly toward the grooves. Otherwise, a mechanism somewhat similar to that used to guide the well-known king pin of a highway trailer in the "V" notch of the "fifth wheel" of a truck-tractor would be satisfactory. These and other suitable means for centering and anchoring the aircraft on the watercraft will readily occur to those familiar with the boating and aircraft industries, and since such centering and anchoring mechanism for the aircraft is not per se a feature of the invention it is not described in detail herein.

The aircraft-towing means comprises a reversible power-driven winch 19 mounted preferably in the surface craft B and activated by suitable or conventional electrical or hydraulic power means energized preferably from the propulsion engine or engines of the surface craft B.

It is desirable to have some resilient or elastic stretch in the towing cable 13 to reduce transmission to the aircraft of wave-induced movements of the surface craft B, for example by using a nylon tow cable 13. Additional resilience may be provided, for example, by operatively mounting a conventional biased torque spring between the winch drum and the drum drive shaft, not shown, so that under tensile stress on the two line the drum will unwind somewhat, and will rewind under the biasing force of the spring when the stress is diminished.

Where a line of limited stretch, such as wire cable, is used, conductor wires for connecting the pilot control means, such as a "black box" 7 in the aircraft to the respective servo means for the engine 5 watercraft steering control and winch control 19 in the surface craft may be embodied in the cable. Otherwise a control wire cable may be run from a separate winch from the surface craft B to pilot control means 7, or radio control means of well-known type may be employed.

The aircraft C comprises a usual fuselage 20, and preferably folding wings 21 and 22. Each wing preferably is provided with a usual aileron 23 and a wing tip float 24 of the type used on seaplanes and flying boats. Since such folding wings, ailerons and floats and the manner of mounting them are well known, and are not per se features of the invention, the details thereof are omitted. Power for folding and opening the wings while the aircraft is supported on the surface craft may comprise conventional electrical servomechanism energized by current transmitted from the usual electrical system.

The aircraft C also has a usual tail assembly or empennage 25, with conventional aircraft-type pilot operated controls for controlling the attitudes of the various aircraft control surfaces for maneuvering the aircraft C. These controls, not shown, are in addition to those provided the aircraft pilot for controlling the tow cable winch 19 and the speed and direction of the surface craft B.

Suitable pilot control means for steering the surface craft B may comprise a tilting foot plate 27 on each rudder pedal 28 of the aircraft of the type used in some land planes to operate the wheel brakes. Each of the tilting plates 27 actuates an adjustable rheostat 29 which controls a conventional steering servomechanism, not shown, in the surface craft, while operation of the entire rudder pedal 28 operates the aircraft rudder 30 in a usual manner.

OPERATION

Figure 1:
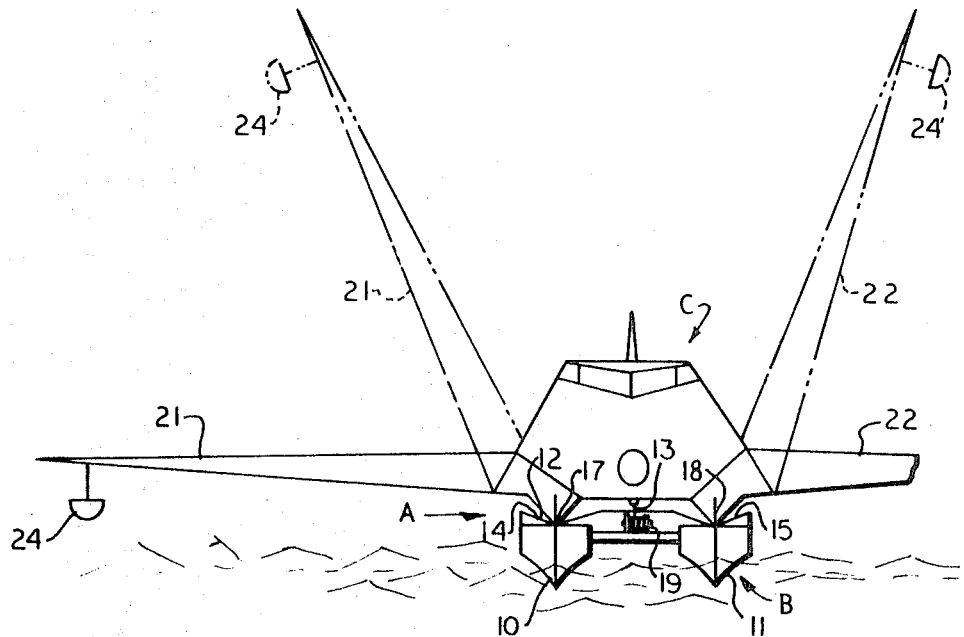
FIG. 1 is a front elevational view of a combined water and air craft as it appears when on the surface of a body of water, the wings being shown in operational position in solid lines and in inoperative, folded position in broken lines.
Figure 3:
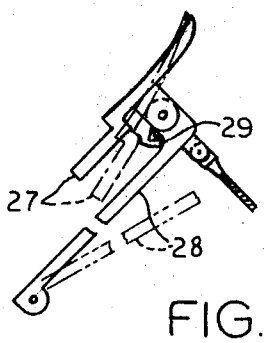
FIG. 3 is an enlarged view in side elevation showing one form of remote control mechanism for steering the boat from the aircraft.

In operating the combined surface and aircraft A, with the aircraft C seated on the surface craft B, and with the wings 21 and 22 in their folded, broken line position of FIG. 1, the pilot and passengers board the aircraft C in a usual manner. The pilot, by a usual control switch provided in the aircraft C, energizes the usual engine-starting means in the surface craft B to start the engine or engines.

After casting off from the dock, float or buoy where the craft A is moored, or at such other time as he may decide, the pilot lowers the wings to their operative, solid line position, and, by means of his engine and surface craft steering controls, gets the combined craft under way, steering the surface craft B by means of his tilting foot plates as mentioned previously herein. Depending upon wind conditions, it may be advisable to also use the aircraft aileron and rudder controls in a well-known manner to assist in surface manipulation of the combined craft.

Upon arrival at the takeoff zone, the pilot preferably heads into the wind and advances the engine throttle or throttles by means of his remote control mechanism referred to previously herein, and when the usual airspeed indicator shows that flying speed has been attained, he releases the latch means which anchors the aircraft C to the surface craft B and eases back on the aircraft control stick or wheel, at the same time operating the winch 19 to reel out the tow cable 13. When the aircraft C has attained a desired altitude, the pilot levels off, secures the winch 19, and maintains a position behind the towing surface craft B, exercising particular care to maintain flying speed when turning or when on any other course than into the wind.

When it is desired to return the aircraft C to the surface craft B, it is preferable to first head into the wind, after which the winch 19 is energized to wind in the tow cable 13, at the same time easing forward on the aircraft elevator control to place the aircraft in approximately level flight, so as to allow no slack in the tow cable. By running the tow cables through a fair lead in the deck of the surface craft B, the cable 13 tends to draw the aircraft into exact, registering relation with the V-grooves in the deck thereby assisting in centering the aircraft in proper position on the surface craft.

After the aircraft C has been landed on the deck of the surface craft B, latching means mentioned previously herein are actuated to secure the aircraft in position. The wings may then be folded to their broken line position of FIG. 1, and the combined surface and air crafts piloted back to its mooring in the same manner in which it left it.

The invention provides an over water transportation means which provides a smooth, fast, sporty ride. In smaller sizes the invention can be used for recreation and commuting, and in larger sizes, where wind conditions are propitious, for passenger service.

Having illustrated and described a preferred embodiment of the invention, I now claim and desire to protect by Letters Patent of the U.S.A.:

1. In combination,
   a motor driven, high-speed watercraft having remote-control-type steering and engine control means,
   a landing platform carried by the watercraft for landing an aircraft thereon,
   a glider-type aircraft of a size and conformation for landing on and taking off from said landing area,
   a tow cable operatively interconnecting the surface craft and the aircraft,
   a reversible power-driven winch with a portion of the tow cable wound thereon, selectively to extend and retract the tow cable, thereby to move the aircraft between a towed, gliding position a selected distance from the surface craft and supported position on the landing platform, and
   control means mounted in the aircraft for controlling the aircraft and for actuating the steering and engine control means and the winch.

2. A watercraft-aircraft combination as defined in claim 1 wherein the aircraft is of the towed glider type.

3. A boat-aircraft combination as claimed in claim 2 wherein the aircraft is motorless.

4. A watercraft-aircraft combination as claimed in claim 1 wherein the cable has limited stretch characteristics.

5. A watercraft-aircraft combination as claimed in claim 1 wherein the watercraft is of the multihull type.

6. A watercraft-aircraft combination as claimed in claim 1 wherein the upper surface of the landing platform slopes downwardly toward a longitudinal groove provided therein, and a landing track element is mounted on and extends lengthwise beneath the aircraft in position to fit into said groove for supporting the aircraft in centered relation on the platform.

7. A watercraft-aircraft combination as claimed in claim 6 wherein the upper surface of the landing platform slopes downwardly toward two longitudinally extending, laterally spaced apart grooves provided therein, and a pair of said landing track elements are mounted on and extend lengthwise beneath the aircraft, said track elements being located and spaced apart to fit into said grooves for supporting the aircraft in centered relation on the platform.